US012592793B2

(12) United States Patent　　　　(10) Patent No.: US 12,592,793 B2
Liu　　　　　　　　　　　　　　(45) Date of Patent: Mar. 31, 2026

(54) SN SYNCHRONIZATION METHOD AND APPARATUS FOR MULTICAST BROADCAST SERVICE, DEVICE, AND READABLE STORAGE MEDIUM

(71) Applicant: VIVO MOBILE COMMUNICATION CO., LTD., Chang'an (CN)

(72) Inventor: Jiamin Liu, Chang'an (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 372 days.

(21) Appl. No.: 18/125,526

(22) Filed: Mar. 23, 2023

(65)　　　　Prior Publication Data

US 2023/0231658 A1　　Jul. 20, 2023

Related U.S. Application Data

(63) Continuation of application No. PCT/CN2021/123544, filed on Oct. 13, 2021.

(30)　　Foreign Application Priority Data

Oct. 16, 2020　(CN) ........................... 202011113010.8

(51) Int. Cl.
　　*H04W 4/00*　　　(2018.01)
　　*H04L 1/1607*　　(2023.01)
　　　　　　(Continued)

(52) U.S. Cl.
　　CPC ............. *H04L 1/1642* (2013.01); *H04W 4/06* (2013.01); *H04W 28/0268* (2013.01); *H04W 56/0015* (2013.01); *H04W 36/0069* (2018.08)

(58) Field of Classification Search
　　CPC ...................................................... H04L 1/1642
　　See application file for complete search history.

(56)　　　　References Cited

U.S. PATENT DOCUMENTS

2005/0094586 A1* 5/2005 Zhang ................... H04L 1/0083
　　　　　　　　　　　　　　　　　　　370/429
2005/0141443 A1 6/2005 Kim et al.
　　　　　　　　　　　(Continued)

FOREIGN PATENT DOCUMENTS

CN　　　101136759 A　　3/2008
CN　　　101166145 A　　4/2008
　　　　　　　(Continued)

OTHER PUBLICATIONS

First Japanese Office Action related to Application No. 2023-519138; reported on Feb. 16, 2024.
　　　　　　　(Continued)

*Primary Examiner* — Elisabeth Benoit Magloire
(74) *Attorney, Agent, or Firm* — von Briesen & Roper, s.c.

(57)　　　　ABSTRACT

This application discloses a sequence number (SN) synchronization method and apparatus for multicast broadcast service, a device, and a readable storage medium. The method includes: obtaining a first radio interface SN of a first multicast broadcast service received in a first cell and a second radio interface SN of the first multicast broadcast service received in a second cell; and sorting data packets of the first multicast broadcast service according to the first radio interface SN and the second radio interface SN; where the first radio interface SN and the second radio interface SN are in a same SN set, and the first radio interface SN and the second radio interface SN are at least partially different.

8 Claims, 4 Drawing Sheets

201

Obtain a first radio interface SN of a first multicast broadcast service received in a first cell and a second radio interface SN of the first multicast broadcast service received in a second cell

202

Sort data packets of the first multicast broadcast service according to the first radio interface SN and the second radio interface SN

(51) Int. Cl.

| | | |
|---|---|---|
| *H04W 4/06* | (2009.01) | |
| *H04W 28/02* | (2009.01) | |
| *H04W 56/00* | (2009.01) | |
| *H04W 36/00* | (2009.01) | |

(56) References Cited

U.S. PATENT DOCUMENTS

| | | | |
|---|---|---|---|
| 2008/0056198 A1* | 3/2008 | Charpentier | ........ H04L 63/0421 370/332 |
| 2009/0161596 A1 | 6/2009 | Wang et al. | |
| 2011/0319066 A1* | 12/2011 | Chou | .................... H04W 88/04 455/422.1 |
| 2014/0098745 A1 | 4/2014 | Balasubramanian et al. | |
| 2014/0286254 A1 | 9/2014 | Agiwal et al. | |
| 2015/0117357 A1* | 4/2015 | Ozturk | .............. H04W 28/0205 370/329 |
| 2018/0083883 A1 | 3/2018 | Sugaya et al. | |
| 2019/0150021 A1 | 5/2019 | Sugaya et al. | |
| 2020/0077287 A1 | 3/2020 | Prasad et al. | |
| 2020/0359449 A1* | 11/2020 | Kim | ...................... H04W 80/02 |

FOREIGN PATENT DOCUMENTS

| | | |
|---|---|---|
| CN | 101316133 A | 12/2008 |
| CN | 107534686 A | 1/2018 |
| CN | 108512628 A | 9/2018 |
| CN | 108934071 A | 12/2018 |
| JP | 2007520114 A | 7/2007 |
| WO | 2007111320 A1 | 10/2007 |
| WO | 2017145471 A1 | 8/2017 |
| WO | 2019167228 A1 | 9/2019 |

OTHER PUBLICATIONS

Huawei, Hisilicon, "Service continuity during mobility for MBS", Agenda item: 8.1.2.2, 3GPP TSG-RAN WG2 Meeting #111-e Electronic, Aug. 17-28, 2020, R2-2007027.

Lenovo, Motorola Mobility (Moderator), "Summary of Offline Discussion on MBS PDCP Count Value Misalignment", Agenda Item: 22.3.1, 3GPP TSG-RAN WG3 #109e Online, Aug. 17-28, 2020, R3-205506.

International Search Report & Written Opinion related to Application No. PCT/CN2021/123544; reported on Jan. 17, 2022.

First Chinese Office Action for related Application No. 202011113010. 8; reported on Aug. 17, 2022.

Lenovo, Motorola Mobility, "Support of Loss-less handover for 5G MBS", Aug. 17-28, 2020, 3GPP TSG-RAN WG3 Meeting #109e, Busan, Online, R3-204922.

* cited by examiner

301

Obtain a radio interface SN of a first multicast broadcast service in a first mode, where the first mode is the same as a mode in which another radio access network node in a same multicast group obtains a radio interface SN of the first multicast broadcast service

400

Obtaining module
401

Sorting module
402

SN SYNCHRONIZATION METHOD AND APPARATUS FOR MULTICAST BROADCAST SERVICE, DEVICE, AND READABLE STORAGE MEDIUM

CROSS-REFERENCE TO RELATED APPLICATIONS

This application is a continuation application of PCT International Application No. PCT/CN2021/123544 filed on Oct. 13, 2021, which claims priority to Chinese Patent Application No. 202011113010.8, filed in China on Oct. 16, 2020, which is incorporated herein by reference in its entirety.

TECHNICAL FIELD

This application relates to the field of communications technologies, and specifically, to an SN synchronization method and apparatus for multicast broadcast service, a device, and a readable storage medium.

BACKGROUND

In broadcast multicast transmission in long term evolution (LTE), an MBMS service can be sent in multicast broadcast single frequency network (MBSFN) mode and a multicast service can be sent in single cell point to multipoint (SC-PTM) mode. In MBSFN mode, cells in a same MBSFN area synchronously send a same broadcast service to facilitate reception by a terminal (for example, user equipment (UE)). Control information (control channel parameters, traffic channel parameters, scheduling information, and the like) and data information about an MBMS service are all sent in broadcast mode, so that both UE in an idle state and UE in a connected state can receive the MBMS service. SC-PTM is a standardized multicast transmission mode following the MBMS service. The major difference from the MBSFN mode is that scheduling and sending are performed only in a single cell and service scheduling is based on a group radio network temporary identifier (group RNTI, g-RNTI). The control channel parameters, a service identifier, period information, and the like are broadcast using a broadcast message. The scheduling information is indicated using a g-RNTI-scrambled physical downlink control channel (PDCCH). A data part is sent in groupcast mode. This is equivalent that interested UE monitors the g-RNTI to obtain data scheduling and then receives the data.

In the prior art, the multicast transmission mode of MBSFN requires strict time synchronization for data packet processing between cells/nodes. Therefore, such architecture uses a synchronization protocol to ensure this. In a same service scheduling period, all cells in a same service area of the MBSFN area receive core network data and send multicast data on a radio interface fully synchronously in time. Therefore, a sequence number (SN) can be reset in each service scheduling period, so as to achieve a same SN. For example, in the first scheduling period of service 1, there are 120 data packets, with the SN numbered from 0 to 119; and in the second scheduling period of service 1, there are 200 data packets, with the SN numbered from 0 to 199. The SN is reset at the boundary of each service scheduling period, so as to achieve synchronization and consistency of all cells. However, this mode is inapplicable to sending of new radio (NR) multicast broadcast service (MBS). The NR MBS service is also sent by a single cell, and there is no synchronization protocol to support strict time synchronization of data packets of each cell, so it is probable that data packets that arrive at different cells in a same scheduling period are different in quantity. Therefore, the SN synchronization mechanism in the existing MBSFN mode cannot be directly applied to the NR MBS service.

SC-PTM has no mechanism to synchronize Layer 2 (L2) SNs of multicast service between different cells/nodes, resulting in separate allocation of L2 SNs for UE's MBS service reception in a source cell/node and in a target cell/node, meaning that the reception is entirely separate. After the UE receives a data packet with SN=100 in the source cell/node, the UE moves to the target cell/node and receives data packets with SN=98, 99, 100, . . . in the target cell. The data packets received in the source and target cells are numbered separately, and therefore cannot be sorted by SN. As a result, movement of the UE may cause data packet loss and repetition, affecting the MBS service reception.

In conclusion, the SN synchronization mechanism of the existing LTE MBS service cannot be directly applied to the NR MBS service.

SUMMARY

According to a first aspect, an SN synchronization method for multicast broadcast service is provided, performed by a terminal and including:

obtaining a first radio interface SN of a first multicast broadcast service received in a first cell and a second radio interface SN of the first multicast broadcast service received in a second cell; and sorting data packets of the first multicast broadcast service according to the first radio interface SN and the second radio interface SN; where the first radio interface SN and the second radio interface SN are in a same SN set, and the first radio interface SN and the second radio interface SN are at least partially different.

According to a second aspect, this application provides an SN synchronization method for multicast broadcast service, performed by a radio access network node and including:

obtaining a radio interface SN of a first multicast broadcast service in a first mode, where the first mode is the same as a mode in which another radio access network node in a same multicast group obtains a radio interface SN of the first multicast broadcast service.

According to a third aspect, an SN synchronization apparatus for multicast broadcast service is provided, applied to a terminal and including:

an obtaining module configured to obtain a first radio interface SN of a first multicast broadcast service received in a first cell and a second radio interface SN of the first multicast broadcast service received in a second cell; and a sorting module configured to sort data packets of the first multicast broadcast service according to the first radio interface SN and the second radio interface SN; where the first radio interface SN and the second radio interface SN are in a same SN set, and the first radio interface SN and the second radio interface SN are at least partially different.

According to a fourth aspect, an SN synchronization apparatus for multicast broadcast service is provided, applied to a radio access network node and including:

an allocation module configured to obtain a radio interface SN of a first multicast broadcast service in a first mode, where the first mode is the same as a mode in which another radio access network node in a same multicast group obtains a radio interface SN of the first multicast broadcast service.

According to a fifth aspect, a terminal is provided and includes a processor, a memory, and a program stored in the memory and capable of running on the processor, where when the program is executed by the processor, the steps of the method according to the first aspect are implemented.

According to a sixth aspect, a network-side device is provided and includes a processor, a memory, and a program stored in the memory and capable of running on the processor, where when the program is executed by the processor, the steps of the method according to the second aspect are implemented.

According to a seventh aspect, a readable storage medium is provided, where the readable storage medium stores a program or instructions, and when the program or instructions are executed by a processor, the steps of the method according to the first aspect or the second aspect are implemented.

According to an eighth aspect, a computer program product is provided, where the computer program product is stored in a non-volatile storage medium, and the computer program product is executed by at least one processor to implement the steps of the processing method according to the first aspect or the second aspect.

According to a ninth aspect, a chip is provided, where the chip includes a processor and a communications interface, the communications interface is coupled to the processor, and the processor is configured to run a program or instructions to implement the processing method according to the first aspect or the second aspect.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application without creative efforts shall fall within the protection scope of this application.

The terms "first", "second", and the like in this specification and claims of this application are used to distinguish between similar objects rather than to describe a specific order or sequence. It should be understood that data used in this way is interchangeable in appropriate circumstances such that the embodiments of this application can be implemented in other orders than the order illustrated or described herein. In addition, objects distinguished by "first" and "second" are generally of a same type, and the object quantities are not limited, for example, there may be one or more first objects. In addition, in this specification and claims, "and/or" indicates at least one of connected objects, and the character "/" generally indicates an "or" relationship between associated objects.

In this specification, radio interface SN synchronization means that a same data packet is allocated with the same radio interface SN in different cells/nodes.

It should be noted that the technologies described in the embodiments of this application are not limited to long term evolution (LTE)/LTE-advanced (LTE-A) systems, but may also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technology described herein may be used in the above-mentioned systems and radio technologies as well as other systems and radio technologies. However, in the following descriptions, a new radio (NR) system is described for an illustration purpose, and NR terms are used in most of the following descriptions, although these technologies may also be applied to other applications than an NR system application, for example, the 6th generation (6G) communications system.

Figure 1:
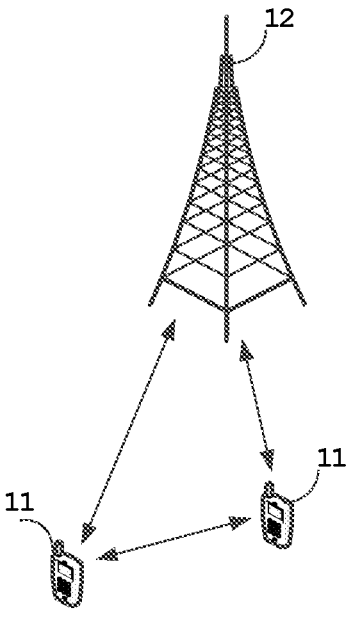
FIG. 1 is a block diagram of a wireless communications system to which embodiments of this application are applicable.

FIG. 1 is a block diagram of a wireless communications system to which the embodiments of this application are applicable. The wireless communications system includes a terminal 11 and a network-side device 12. The terminal 11 may also be referred to as a terminal device or user equipment (UE). The terminal 11 may be a terminal-side device, such as a mobile phone, a tablet personal computer, a laptop computer or a notebook computer, a personal digital assistant (PDA), a palmtop computer, a netbook, an ultra-mobile personal computer (UMPC), a mobile internet device (MID), a wearable device, vehicle user equipment (VUE), or pedestrian user equipment (PUE). The wearable device includes a wrist band, earphones, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a home NodeB, a home evolved NodeB, a WLAN access point, a Wi-Fi node, a transmitting receiving point (TRP), a radio access network node, or another appropriate term in the art. Provided that a same technical effect is achieved, the base station is not limited to a specific technical term. It should be noted that in the embodiments of this application, the base station in the NR system is only used as an example, and a specific type of the base station is not limited.

An SN synchronization method and apparatus for multicast broadcast service, a device, and a readable storage medium provided in the embodiments of this application are described in detail below by using specific embodiments and application scenarios thereof with reference to the accompanying drawings.

Figure 2:
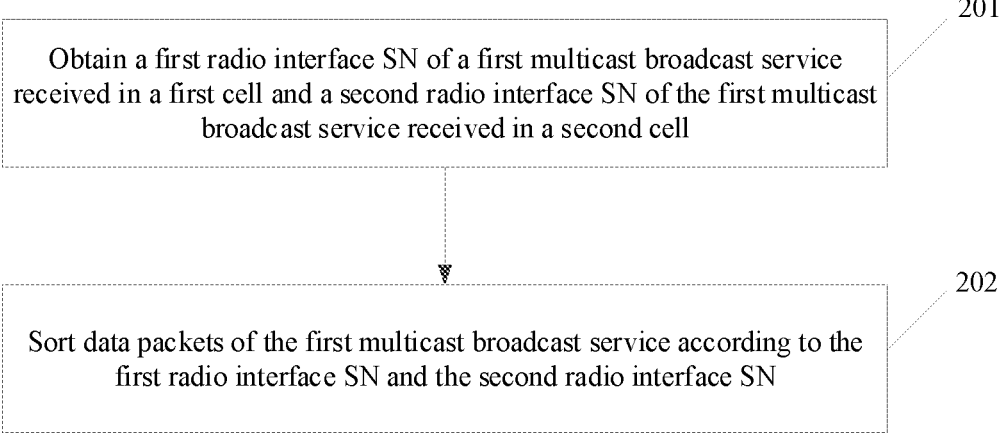
FIG. 2 is a first flowchart of an SN synchronization method for multicast broadcast service according to an embodiment of this application.

Refer to FIG. 2. An embodiment of this application provides an SN synchronization method for multicast broadcast service. The method is performed by a terminal, and specific steps include step 201 and step 202.

Step 201. Obtain a first radio interface SN of a first multicast broadcast service received in a first cell and a second radio interface SN of the first multicast broadcast service received in a second cell.

Step 202. Sort data packets of the first multicast broadcast service according to the first radio interface SN and the second radio interface SN.

The first radio interface SN and the second radio interface SN are in a same SN set, and the first radio interface SN and the second radio interface SN are at least partially different.

For example, if the SN set includes 1, 2, 3, 4, 5, 6, 7, 8, 9, and 10, the first radio interface SN includes 1, 2, 3, 4, and 5, and the second radio interface SN includes 6, 7, 8, 9, and 10, the data packets of the first multicast broadcast service are sorted in ascending order of the SNs.

In this embodiment of this application, the method shown in FIG. 2 may further include: in a case that the data packets of the first multicast broadcast service are inconsecutive, determining that a data packet in the first multicast broadcast service is missing; and in a case that the first multicast broadcast service does not support reordering of the data packets, skipping starting a reordering timer at a gap when the missing data packet is detected; or in a case that the first multicast broadcast service supports reordering of the data packets, starting a reordering timer at a gap when the missing data packet is detected.

For example, if the first radio interface SN includes 1, 2, 3, 4, and 5 and the second radio interface SN includes 7, 8, 9, and 10, a data packet with SN=6 can be determined to be a missing data packet.

In this embodiment of this application, the method shown in FIG. 2 may further include: in a case that the data packets of the first multicast broadcast service are inconsecutive, determining that a data packet in the first multicast broadcast service is repeated, and deleting the repeated data packet.

For example, if the first radio interface SN includes 1, 2, 3, 4, and 5 and the second radio interface SN includes 5, 6, 7, 8, 9, and 10, a data packet with SN=5 can be determined to be a repeated data packet.

In other words, after the data packets of the first multicast broadcast service are sorted according to the first radio interface SN and the second radio interface SN, a missing data packet and/or a repeated data packet can be detected and then processed correspondingly.

In this embodiment of this application, the method shown in FIG. 2 may further include: receiving first information, where the first information indicates information about the missing data packet for the first multicast broadcast service (for example, missing PDU info).

Optionally, a data packet previous to or next to the missing data packet is received, where a header of the data packet previous to or next to the missing data packet carries the first information, for example, N-bit header information, in which 000 represents normal consecutive data, 001 indicates that one data packet next to or previous to a current data packet is missing, 010 indicates that two consecutive data packets next to or previous to the current data packet are missing, and 011 indicates that three consecutive data packets next to or previous to the current data packet are missing.

Alternatively, optionally, a control PDU (control PDU) is received, where the control PDU carries the first information, and the first information includes a start SN of the missing data packet and the number of consecutive missing data packets.

In this embodiment of this application, continuous reception can still be implemented for an MBS service of a terminal in a scenario in which the terminal moves from a source cell to a target cell, which facilitates continuity of the MBS service, improving MBS service reception experience of the terminal while ensuring system efficiency.

Figures 3, 4:
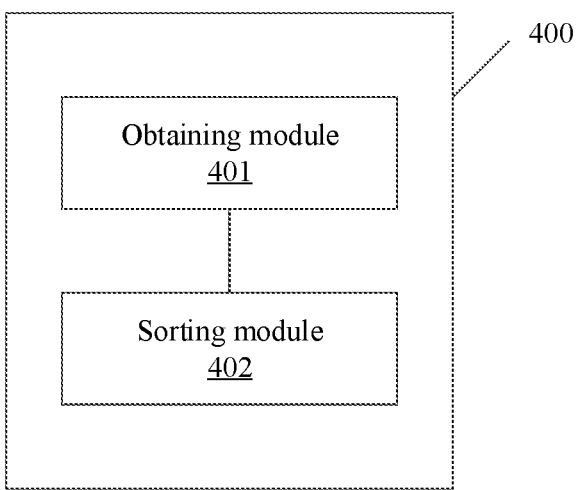
FIG. 3 is a second flowchart of an SN synchronization method for multicast broadcast service according to an embodiment of this application.
FIG. 4 is a first schematic diagram of an SN synchronization apparatus for multicast broadcast service according to an embodiment of this application.

Refer to FIG. 3. An embodiment of this application provides an SN synchronization method for multicast broadcast service, applied to a radio access network node, for example, a base station. A specific step includes step 301.

Step 301. Obtain a radio interface SN of a first multicast broadcast service in a first mode, where the first mode is the same as a mode in which another radio access network node in a same multicast group obtains a radio interface SN (or referred to as a Uu SN) of the first multicast broadcast service.

In this embodiment of this application, step 301 is implemented in the following manner: obtaining the radio interface SN of the first multicast broadcast service according to a first SN, where the first SN is a transmission channel SN (or referred to as a CN SN) of a multicast broadcast service protocol data unit session (MBS PDU session) at an interface between a core network node and the radio access network node, or an SN (or referred to as a CN SN) of a QoS flow in an MBS PDU session.

In this embodiment of this application, the MBS PDU session includes a plurality of QoS flows, where in a case that the radio access network node maps each QoS flow in the MBS PDU session to a different MRB, the first SN is an SN of the QoS flow; or in a case that the radio access network node maps all the QoS flows in the MBS PDU session to one MRB, the first SN is a transmission channel SN of the MBS PDU session; or in a case that the radio access network node maps a first QoS flow in the MBS PDU session to one MRB, the first SN is an SN of the first QoS flow; and in a case that the radio access network node maps remaining QoS flows in the MBS PDU session other than the first QoS flow to one data radio bearer, the first SN is a transmission channel SN of the MBS PDU session; or in a case that at least part of the QoS flows in the MBS PDU session have no SN, the first SN is a transmission channel SN of the MBS PDU session.

It should be noted that the manner for mapping the QoS flow to the MRB may be a default manner, or negotiated between nodes, or decided by one node.

Optionally, the radio interface SN is equal to the first SN; or the radio interface SN is equal to a modulus of the sum of the first SN and an offset; or the radio interface SN is equal to a specified number of bits of the first SN; or the radio interface SN is equal to a specified number of bits of the first SN and a padding bit, the padding bit being a specified value.

Optionally, in a case that a length of the first SN is greater than a length of the radio interface SN, the radio interface SN is equal to N least significant bits of the first SN, where N is a bit length of the radio interface SN.

Optionally, in a case that a length of the first SN is less than a length of the radio interface SN, M least significant bits of the radio interface SN are equal to the first SN, and all remaining bits of the radio interface SN are padded with a specified value (for example, the specified value is 0), where M is a bit length of the first SN.

For example, the M lowest bits are M least significant bits (least significant bits), or rightmost M bits (rightmost M bits).

Figures 7, 8:
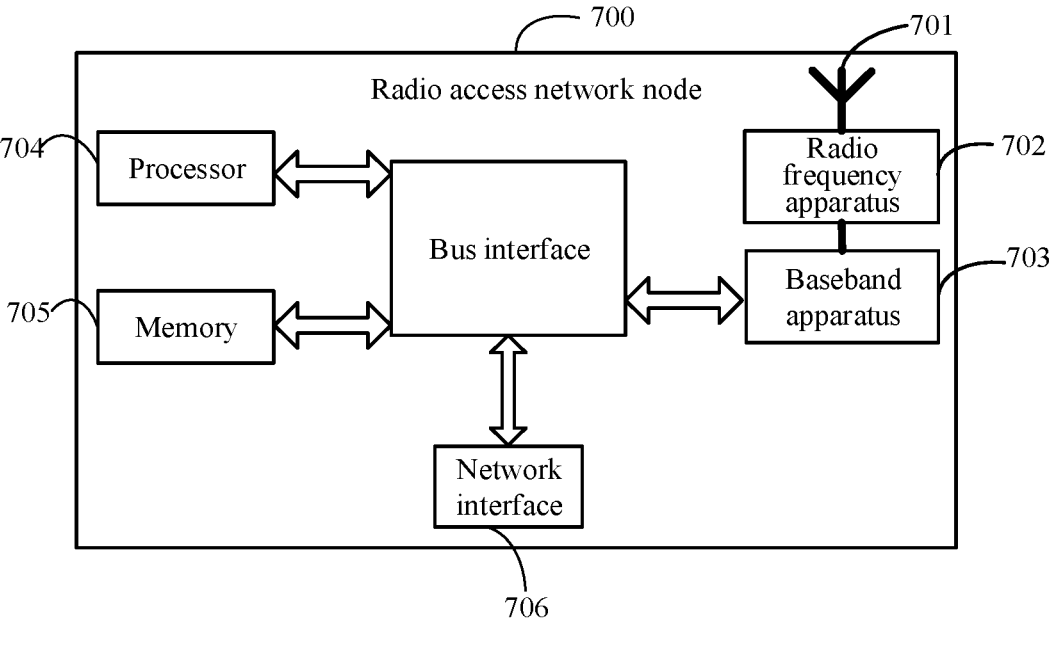
FIG. 7 is a schematic diagram of a network-side device according to an embodiment of this application.
FIG. 8 is a schematic diagram of SNs having identical rightmost bits according to an embodiment of this application.

Referring to FIG. 8, rightmost 12 bits of a 16-bit general packet radio service tunnelling protocol user plane (GTP)-U SN are the same as a 12-bit packet data convergence protocol (PDCP) SN, and rightmost 16 bits of an 18-bit PDCP SN are the same as the 16-bit GTP-U SN.

It should be noted that a length of a PDCP SN may be 12 bits or 18 bits.

It should be noted that the calculation manner of the radio interface SN may be a default manner, or negotiated between nodes, or decided by one node.

In this embodiment of this application, the transmission channel SN of the MBS PDU session includes a general packet radio service tunnelling protocol user plane (GTP-U) tunnel SN.

In this embodiment of this application, the method shown in FIG. 3 further includes: sending first information, where the first information indicates information about a missing data packet for the first multicast broadcast service sent by the radio access network node.

In this embodiment of this application, before the sending first information, the method shown in FIG. 3 further includes: in a case that the first multicast broadcast service supports reordering of data packets, performing the step of sending first information; or in a case that the first multicast broadcast service does not support reordering of data packets, skipping performing the step of sending first information.

Optionally, the sending first information includes: sending a data packet previous to or next to the missing data packet, where a header of the data packet previous to or next to the missing data packet carries the first information; or sending a control PDU, where a type of the control PDU indicates the first information.

In this embodiment of this application, the radio interface SN is a packet data convergence protocol layer (PDCP layer) SN and/or a radio link control layer (RLC) SN.

In this embodiment of this application, in cells/nodes in a same multicast group, radio interface SNs are allocated in a same manner such that L2 SNs for an MBS service received by a terminal in a source cell/node and in a target cell/node are allocated consecutively, not separately. In this way, continuous reception can still be implemented for the MBS service of the terminal in a scenario in which the terminal moves from the source cell to the target cell, which facilitates continuity of the MBS service, improving MBS service reception experience of the terminal while ensuring system efficiency.

Embodiment 1: SNs Being Equal by Default in the Case of One MRB

In a typical transmission scenario of MBS service, all service data of one MBS service is mapped to one radio interface MRB (Multicast Radio Bearer) for transmission, meaning that there is a one-to-one relationship between MBS PDU sessions and MRBs. Each MBS packet has a unique SN in the PDU session, for example, a GTP-U tunnel SN. In addition, for each MBS packet from a core network, a base station needs to allocate a Uu SN, for example, a PDCP SN and/or an RLC SN.

A multicast channel of a core network node is from one core network node, for example, an MBS user plane function (UPF), to multiple related radio access network (RAN) nodes. Therefore, on this multicast channel, data received by each RAN node is the same, that is, a same data packet definitely carries a same GTP-U tunnel SN corresponding to the MBS PDU session. Therefore, to allocate a same Uu SN to a same MBS packet between these RAN nodes, the simplest way is making the Uu SN directly equal to a CN SN. However, because the Uu SN and the CN SN are different in length, different equalizing methods are required. Details are as follows.

In a case that the CN SN and the Uu SN are the same in length, Uu SN=CN SN.

For example, in a case that the CN SN and the Uu SN are the same in length, both being 16 bits long, each bit of the Uu SN is directly set to a value of a corresponding bit of the CN SN, so as to obtain an entirely replicated Uu SN. Such Uu SNs obtained in all cells are fully consistent.

In a case that a length of the CN SN is greater than a length of the Uu SN, the Uu SN uses N least significant bits of the CN SN, where N is a bit length of the Uu SN.

For example, in a case that the CN SN is 16 bits long and the Uu SN is 12 bits long, the Uu SN directly uses a value corresponding to 12 least significant bits of the CN SN as its value and discards a value corresponding to 4 most significant bits of the CN SN, so that a corresponding Uu SN is obtained. Such Uu SNs obtained in all cells are fully consistent.

In a case that a length of the CN SN is less than a length of the Uu SN, M least significant bits of the Uu SN are equal to the CN SN, and all remaining highest bits of the Uu SN are padded with 0, where M is a bit length of the CN SN.

For example, in a case that the CN SN is 16 bits long and the Uu SN is 18 bits long, the Uu SN directly uses a value corresponding to the 16 bits of the CN SN as a value corresponding to its own 16 least significant bits, and the 2 most significant bits of the Uu SN are padded with 0, so that a corresponding Uu SN is obtained. Such Uu SNs are fully consistent in all cells because they are obtained in a same way.

As described above, the RAN nodes in the multicast group use the same way to obtain Uu SNs based on the same CN SN, so the Uu SNs obtained are definitely synchronous, meaning that a same data packet is allocated with the same Uu SN in different cells/nodes.

In this way, in a case that a UE receives Uu SNs 98 and 99 of an MBS service in a source cell, and then moves to a target cell and continues to receive Uu SNs 100, 101, . . . , of this MBS service, the packets can be sorted by SNs. Alternatively, in a case that the UE receives Uu SNs 99, 100, . . . of the MBS service in the target cell, the UE can know that the data packet with Uu SN=99 is a repeatedly received data packet and can be deleted, and transfers the data packet with Uu SN=100 and subsequent data packets to a higher layer.

There are some special cases, for example, packet loss or disorder occurs in CN interface data of a cell. For example, a receiving order of CN SNs is 98, 99, 101, 102, . . . , meaning that a middle packet with SN=100 may be lost. In this case, the cell can only send packets in an order of Uu SNs 98, 99, 101, and 102. For a UE, in a case that this service does not support a data packet reordering function (for example, duration of a PDCP layer reordering timer is 0), after receiving a disordered data packet with Uu SN=101, the UE directly sends the data packet to a higher layer without waiting for a data packet with Uu SN=100. In a case that this service supports a reordering function (for example, duration of a PDCP layer reordering timer is set to a positive value), after receiving a disordered data packet with Uu SN=101, the UE starts the reordering timer to wait for a data packet with Uu SN=100, and transfers the data packet with Uu SN=101 to a higher layer only after the reordering timer expires. Herein, to prevent the UE from waiting for the data packet with Uu SN=100 that is never sent by a network side, the UE may be notified of information about the missing data packet.

Information about the missing data packet with Uu SN=100 may be carried in another data packet, for example, a data packet with Uu SN=99 or a data packet with Uu SN=101. For example, a header of the data packet with Uu SN=99 or the data packet with Uu SN=101 carries information about one or more missing data packets next to/previous to the data packet with Uu SN=99 or the data packet with Uu SN=101. In N-bit header information, 000 represents normal consecutive data, 001 indicates that one data packet next to or previous to a current data packet is missing, 010 indicates that two consecutive data packets next to or previous to the current data packet are missing, 011 indicates that three consecutive data packets next to or previous to the current data packet are missing, and so on.

Alternatively, a control PDU may be used for indication. A PDU type indicates missing PDU info, and a payload part carries information about the missing packet, a start SN, and the number of consecutive missing data packets.

The UE obtains the information about the missing data packet, and can then clearly know that such data packet is never sent due to the missing data of the node on the base station side. Therefore, in a case that a reordering timer is configured, the UE does not start the reordering timer at the gap for the missing data packet, but directly bypasses the missing data packet and performs subsequent continuous reception.

For example, the UE is notified that one data packet next to the data packet with Uu SN=99 or previous to the data packet with Uu SN=101 is missing. In this case, after the UE receives the data packet with Uu SN=99 and then receives the data packet with Uu SN=101, the UE knows that the data packet with Uu SN=100 is missing, and directly treats the data packet with Uu SN=100 as received without waiting. Moreover, the UE does not start a reordering timer for the data packet with Uu SN=100, but directly updates a reception state variable based on the data packet with Uu SN=101 being a consecutively received packet, and transfers the data packet with Uu SN=101 to a higher layer.

Embodiment 2: Processing in the Case of Multiple QoS Flows

Embodiment 1 describes the simplest processing mode in which the MBS session is mapped to one MRB. However, in one MBS session, data flows with different characteristics may exist and need to be treated differently. In other words, one MBS session may include a plurality of QoS flows, and each QoS flow has a different QoS requirement. For example, a video service may include three QoS flows: audio, image, and control information, each having a different transmission requirement.

In a case that one MBS session includes a plurality of QoS flows, the radio interface may have different mapping modes.

In a first mode, different QoS flows are mapped to different MRBs on the radio interface. For example, one MBS session includes QoS flows 1/2/3, and they are mapped to MRBs 1/2/3 respectively.

In this case, data of QoS flow 1 is transmitted on MRB 1. Because on the interface between the CN and the RAN, there are SNs at a QoS flow level, and all data packets in one QoS flow are sequentially numbered, and apart from the three QoS flows, there are also session level SNs at an MBS session level.

TABLE 1

| Numbering example of CN SNs | | | | | | | | | | | |
|---|---|---|---|---|---|---|---|---|---|---|---|
| Session SN: | 0 | 1 | 2 | 3 | 4 | 5 | 6 | 7 | 8 | 9 | 10 |
| QoS flow 1 SN: | 0 | | | 1 | | | | 2 | 3 | | |
| QoS flow 2 SN: | | 0 | 1 | | | | | | | 2 | 3 |
| QoS flow 3 SN: | | | | | 0 | 1 | 2 | | | | |

According to the example in Table 1, there are dual queues. One queue is at the MBS session level, where data of all QoS flows is sorted in order to obtain the session level SNs. Then, in each QoS flow, for example, QoS flow 1, each piece of data still has a dedicated SN for QoS flow 1, through which data belonging to QoS flow 1 is counted and sorted.

Because QoS flow 1 and MRB 1 are in a one-to-one mapping, that is, a Uu SN of the MRB can be directly obtained using a CN SN of QoS flow 1. The principle of SNs being equal by default applies. For a specific manner, refer to the three cases in Embodiment 1.

In a second mode, different QoS flows are still mapped to a same MRB on the radio interface. For example, one MBS session includes QoS flow 1, QoS flow 2, and QoS flow 3, and they are all mapped to MRB 1.

In this mode, although there are a plurality of QoS flows, and there may be SNs at the QoS flow level, because the entire MBS session is mapped to one MRB, no differentiation is required for the QoS flows, and a Uu SN of MRB 1 can be directly obtained using a CN SN of the MBS PDU session, that is, the principle of SNs being equal by default applies. For a specific mode, refer to the three cases in Embodiment 1.

In another mode, similar QoS flows, rather than all the QoS flows, are mapped to MRB 1, and remaining QoS flows with similar QoS requirements are mapped to MRB 2.

Table 1 is still used as an example. For example, QoS flow 1 and QoS flow 2 are mapped to MRB 1 due to their similar QoS requirements, and QoS flow 3 is mapped to MRB 2. In this case, because MRB 2 has only one QoS flow, the Uu SN corresponding to MRB 2 can be directly equal to the CN SN of QoS flow 3, that is, the principle of SNs being equal by default applies. For a specific mode, refer to the three cases in Embodiment 1.

MRB 1 is complex because it includes QoS flow 1 and QoS flow 2. In this case, the SNs at the QoS flow level cannot be used, and only the CN SN at the PDU session level can be used as the MRB 1 Uu SN. However, the CN SNs at the PDU session level also include counts of QoS flow 3, and only QoS flow 1 and QoS flow 2 are mapped to MRB 1. Therefore, there are inevitably some gaps for the CN SNs. For example, the packets with session SN=4, 5, and 6 in Table 1 are not mapped to MRB 1, and thus some Uu SNs are missing. Processing varies according to different cases.

In a case that the service does not support reordering of the data packets, no notification about the missing data packet is required, and no reordering timer is started at the receiving gap of the UE. The UE receives data packets with session SN=0, 1, 2, and 3, directly followed by data packets with session SN=7, 8, 9, and 10, and directly transfers the data packets to a higher layer in such order.

In a case that the service supports reordering and no notification about the missing data packet is required, the UE starts a reordering timer at the receiving gap. The UE receives data packets with session SN=0, 1, 2, and 3, directly followed by data packets with session SN=7, 8, 9, and 10, and the UE starts the reordering timer for data packets with session SN=4, 5, and 6 at the gap, and transfers the subsequent data packets with session SN=7, 8, 9, and 10 to a higher layer only after the reordering timer expires.

In a case that the service supports reordering and notification about the missing data packet is required, the UE does not consider such missing SN as a receiving gap, and does not start a reordering timer. Data packets with session SN=0, 1, 2, and 3 are received, directly followed by data packets with session SN=7, 8, 9, and 10, and the UE knows that data packets with session SN=4, 5, and 6 are missing, and directly transfers the data packets to a higher layer according to the receiving order. Notification about the missing data packet is sent in the following two manners.

Carried in a PDU header. For example, that three data packets next to session SN=3 or previous to session SN=7 are missing are carried in a data packet with session SN=3 or 7. For missing PDU info in the header, 000 represents normal data, 001 indicates that one data packet next to or previous to the data packet is missing, 010 indicates that two data packets next to or previous to the data packet are missing, 011 indicates that three data packets next to or previous to the data packet are missing, and so on.

Carried in a control PDU. A PDU type indicates missing PDU info, in which SN=4 and number (num)=3 indicate that a data packet with session SN=4 and three consecutive data packets starting from the data packet with session SN=4 are missing.

Embodiment 3: Configuration or Default

The simplest way is to specify a consistent behavior for all radio access network nodes (for example, base stations) in the protocol.

For mapping of the QoS flow to the MRB, one or a combination of the following may be specified.

(1) In a case that one MBS session includes only one QoS flow, the QoS flow is mapped to one MRB, and a Uu SN is directly equal to a session level CN SN.

(2) In a case that one MBS session includes two or more QoS flows, all the QoS flows are mapped to one MRB, and a Uu SN is directly equal to a session level CN SN.

(3) In a case that one MBS session includes two or more QoS flows, each QoS flow is mapped to a separate MRB, and a Uu SN is directly equal to a QoS flow level CN SN.

(4) In a case that one MBS session includes two or more QoS flows, if a value of QoS flow number is greater than a threshold, all the QoS flows are mapped to one MRB, and a Uu SN is directly equal to a session level CN SN.

(5) In a case that one MBS session includes two or more QoS flows, if a value of QoS flow number is less than or equal to a threshold, each QoS flow is mapped to a separate MRB, and a Uu SN is directly equal to a QoS flow level CN SN.

The threshold for QoS flow number is equal to the maximum number of MRBs that can be supported by one MBS service.

For all the foregoing principles of equality, refer to the principle of Uu SN being equal to CN SN in Embodiment 1.

For obtaining of the Uu SN, a consistent behavior is specified for all radio access network nodes (for example, base stations) as follows:

(1) For MRBs corresponding to all MBS services, Uu SNs are all 12 bits long.

(2) For MRBs corresponding to all MBS services, Uu SNs are all 18 bits long.

(3) For an MRB meeting QoS condition 1, a Uu SN is 12 bits long, and for example, reordering is not required; and for an MRB meeting QoS condition 2, a Uu SN is 18 bits long, and for example, reordering is required.

After being determined, the Uu SN is obtained according to the principle of Uu SN being equal to CN SN in Embodiment 1.

Another way

Another flexible way is to determine a behavior of a radio access network node (for example, a base station) through configuration or indication.

In a process of establishing an MBS session, a core network notifies a radio access network node (for example, a base station) of characteristics of the MBS session, for example, the number of QoS flows, QoS parameters of the QoS flows, and whether different MRB are required to carry different QoS flows. After receiving the characteristics, the radio access network node (for example, a base station) performs a mapping operation according to the indication of the core network.

Alternatively, radio access network nodes (for example, base stations) exchange specific content of a mapping operation. For example, a radio access network node (for example, a base station) that newly joins a multicast group may request, through an interface between radio access network nodes (for example, base stations), a radio access network node (for example, a base station) that is already in the multicast group for a specific configuration of radio access network nodes (for example, base stations), for example, a QoS flow to MRB mapping relationship and a CN SN-Uu SN mapping relationship, and performs an operation according to the obtained information.

Alternatively, a centralized node performs coordination to generate consistent configuration information and mapping information and distribute such information to other radio access network nodes (for example, base stations) and new radio access network nodes (for example, base stations). The radio access network nodes (for example, base stations) act according to such information.

Embodiment 4: Offset

In the foregoing embodiments, Uu SN being equal to CN SN is used as an example. In fact, a Uu SN can also be obtained by offsetting a CN SN:

Uu SN=CN SN+delta, where delta is specified by the standard, negotiated between radio access network nodes (for example, base stations), reported by a unified node, or reported by a core network.

The Uu SN uses a specified number of bits of a CN SN. For example, the Uu SN uses only X least significant bits of the CN SN, and the remaining bits are padded with 0. The number of X bits may be equal to or less than the number of bits of the CN SN, and a value of X is specified by the standard, negotiated between radio access network nodes (for example, base stations), reported by a unified node, or reported by a core network.

Refer to FIG. 4. An embodiment of this application provides an SN synchronization apparatus for multicast broadcast service, applied to a terminal. The apparatus 400 includes:

an obtaining module 401 configured to obtain a first radio interface SN of a first multicast broadcast service received in a first cell and a second radio interface SN of the first multicast broadcast service received in a second cell; and a sorting module 402 configured to sort data packets of the first multicast broadcast service according to the first radio interface SN and the second radio interface SN, for example, sorting the data packets of the first multicast broadcast service in ascending order of the SNs; where The first radio interface SN and the second radio interface SN are in a same SN set, and the first radio interface SN and the second radio interface SN are at least partially different.

In some embodiments, the apparatus 400 further includes: a processing module configured to: in a case that the data packets of the first multicast broadcast service are inconsecutive, determine that a data packet in the first multicast broadcast service is missing; and in a case that the first multicast broadcast service does not support reordering of the data packets, skip starting a reordering timer at a gap when the missing data packet is detected; or in a case that the first multicast broadcast service supports reordering of the data packets, start a reordering timer at a gap when the missing data packet is detected.

In some embodiments, the apparatus 400 further includes: a receiving module configured to receive first information, where the first information indicates information about the missing data packet for the first multicast broadcast service.

In some embodiments, the receiving module is further configured to: receive a data packet previous to or next to the missing data packet, where a header of the data packet previous to or next to the missing data packet carries the first information; or receive a control PDU, where the control PDU carries the first information.

The apparatus provided in this embodiment of this application can implement the processes implemented in the method embodiment shown in FIG. 3, with the same technical effects achieved. To avoid repetition, details are not described herein again.

Figure 5:
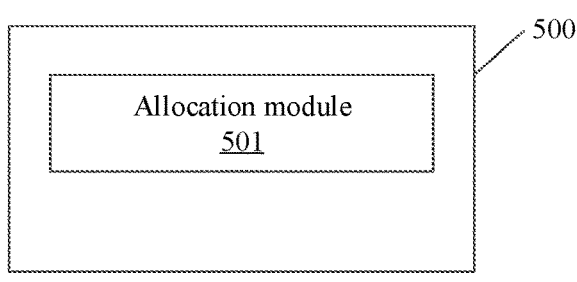
FIG. 5 is a second schematic diagram of an SN synchronization apparatus for multicast broadcast service according to an embodiment of this application.

Refer to FIG. 5. An embodiment of this application provides an SN synchronization apparatus for multicast broadcast service, applied to a radio access network node. The apparatus 500 includes:

an allocation module 501 configured to obtain a radio interface SN of a first multicast broadcast service in a first mode, where the first mode is the same as a mode in which another radio access network node in a same multicast group obtains a radio interface SN of the first multicast broadcast service.

In some embodiments, the allocation module 501 is further configured to obtain the radio interface SN of the first multicast broadcast service according to a first SN, where the first SN is a transmission channel SN of a multicast broadcast service protocol data unit session MBS PDU session at an interface between a core network node and the radio access network node, or an SN of a QoS flow in an MBS PDU session.

In some embodiments, the MBS PDU session includes a plurality of QoS flows, where in a case that the radio access network node maps each QoS flow in the MBS PDU session to a different MRB, the first SN is an SN of the QoS flow;

or in a case that the radio access network node maps all the QoS flows in the MBS PDU session to one MRB, the first SN is a transmission channel SN of the MBS PDU session;

or in a case that the radio access network node maps a first QoS flow in the MBS PDU session to one MRB, the first SN is an SN of the first QoS flow; and in a case that the radio access network node maps remaining QoS flows in the MBS PDU session other than the first QoS flow to one data radio bearer, the first SN is a transmission channel SN of the MBS PDU session;

or in a case that at least part of the QoS flows in the MBS PDU session have no SN, the first SN is a transmission channel SN of the MBS PDU session.

In some embodiments, the radio interface SN is equal to the first SN; or the radio interface SN is equal to a modulus of the sum of the first SN and an offset; or the radio interface SN is equal to a specified number of bits of the first SN; or the radio interface SN is equal to a specified number of bits of the first SN and a padding bit, the padding bit being a specified value.

In some embodiments, that the radio interface SN is equal to a specified number of bits of the first SN includes:

in a case that a length of the first SN is greater than a length of the radio interface SN, the radio interface SN is equal to N least significant bits of the first SN, where N is a bit length of the radio interface SN.

In some embodiments, that the radio interface SN is equal to a specified number of bits of the first SN and a padding bit, the padding bit being a specified value, includes:

in a case that a length of the first SN is less than a length of the radio interface SN, M least significant bits of the radio interface SN are equal to the first SN, and all remaining bits of the radio interface SN are padded with the specified value, where M is a bit length of the first SN.

In some embodiments, the transmission channel SN of the MBS PDU session includes a GTP-U tunnel SN.

In some embodiments, the apparatus 500 further includes: a sending module configured to send first information, where the first information indicates information about a missing data packet for the first multicast broadcast service sent by the radio access network node.

In some embodiments, the apparatus 500 further includes: an execution module configured to: in a case that the first multicast broadcast service supports reordering of data packets, trigger the sending module to send the first information; or in a case that the first multicast broadcast service does not support reordering of data packets, skip triggering the sending module to send the first information.

In some embodiments, the sending module is further configured to: send a data packet previous to or next to the missing data packet, where a header of the data packet previous to or next to the missing data packet carries the first information; or send a control PDU, where a type of the control PDU indicates the first information.

In some embodiments, the radio interface SN is a packet data convergence protocol layer SN and/or a radio link control layer SN.

The apparatus provided in this embodiment of this application can implement the processes implemented in the method embodiment shown in FIG. 3, with the same technical effects achieved. To avoid repetition, details are not described herein again.

Figure 6:
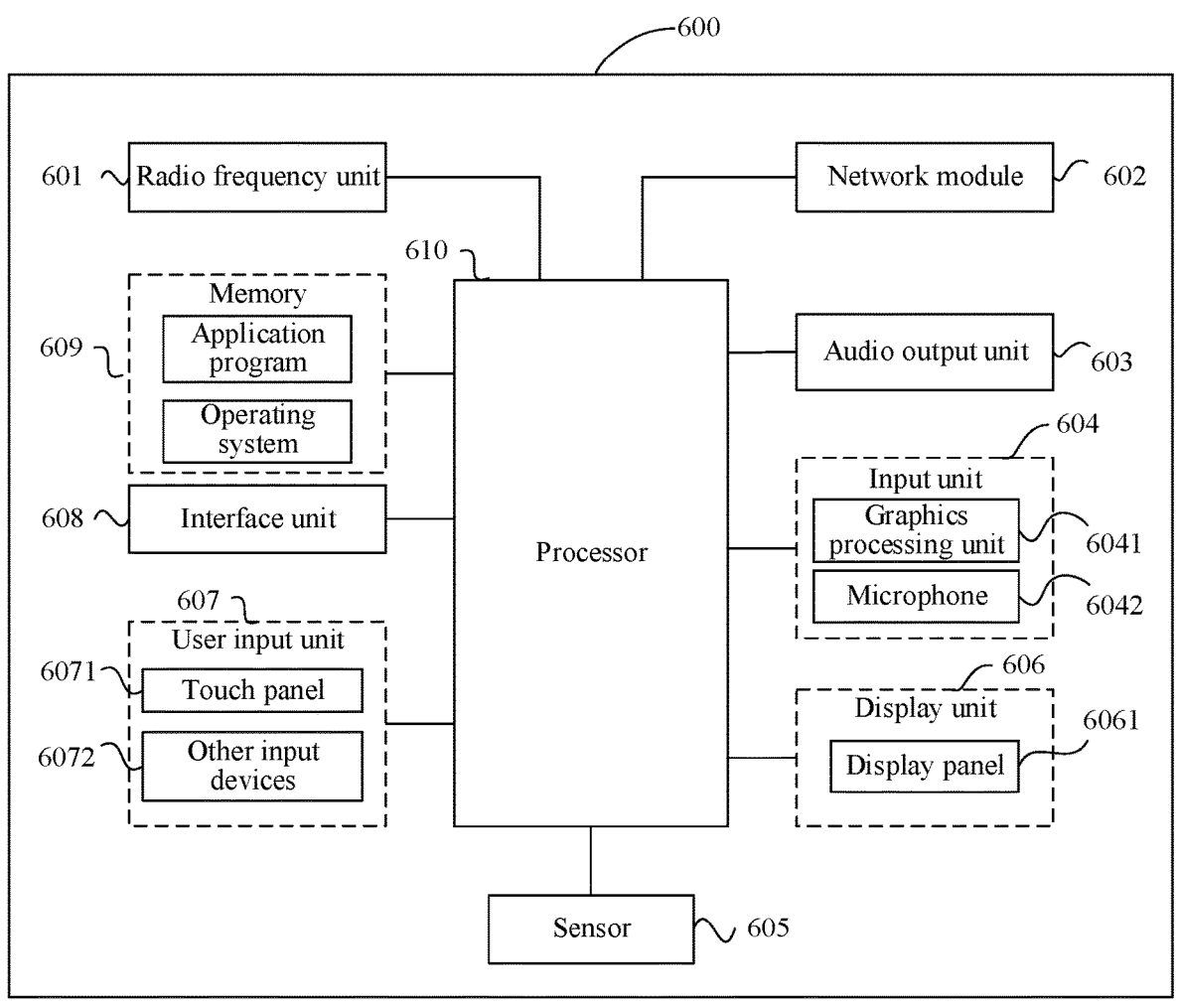
FIG. 6 is a schematic diagram of a terminal according to an embodiment of this application.

FIG. 6 is a schematic diagram of a hardware structure of a terminal for implementing the embodiments of this application.

The terminal 600 includes but is not limited to components such as a radio frequency unit 601, a network module 602, an audio output unit 603, an input unit 604, a sensor 605, a display unit 606, a user input unit 607, an interface unit 608, a memory 609, and a processor 610.

Persons skilled in the art can understand that the terminal 600 may further include a power supply (for example, a battery) for supplying power to the components. The power supply may be logically connected to the processor 610 via a power management system, so that functions such as charge management, discharge management, and power consumption management are implemented via the power management system. The terminal structure shown in FIG. 6 does not constitute any limitation on the terminal. The terminal may include more or fewer components than shown in the figure, or combine some of the components, or arrange the components differently. Details are not described herein again.

It should be understood that in the embodiments of this application, the input unit 604 may include a graphics processing unit (GPU) 6041 and a microphone 6042. The graphics processing unit 6041 processes image data of a static picture or a video that is obtained by an image capture apparatus (for example, a camera) in an image capture mode or a video capture mode. The display unit 606 may include a display panel 6061, and the display panel 6061 may be configured in a form of a liquid crystal display, an organic light-emitting diode display, or the like. The user input unit 607 includes a touch panel 6071 and other input devices 6072. The touch panel 6071 is also referred to as a touchscreen. The touch panel 6071 may include two parts: a touch detection apparatus and a touch controller. The other input devices 6072 may include but are not limited to a physical keyboard, a functional button (such as a volume control button or a power on/off button), a trackball, a mouse, and a joystick. Details are not described herein.

In this embodiment of this application, the radio frequency unit 601 sends downlink data received from a network-side device to the processor 610 for processing, and in addition, sends uplink data to the network-side device. Generally, the radio frequency unit 601 includes but is not limited to an antenna, at least one amplifier, a transceiver, a coupler, a low noise amplifier, and a duplexer.

The memory 609 may be configured to store a software program or instructions and various data. The memory 609 may mainly include a program or instruction storage area and a data storage area. The program or instruction storage area may store an operating system, an application program or instructions required by at least one function (for example, a sound play function and an image play function), and the like. In addition, the memory 609 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or other non-volatile solid-state storage devices.

The processor 610 may include one or more processing units. Optionally, the processor 610 may integrate an application processor and a modem processor. The application processor mainly processes an operating system, a user interface, an application program or instructions, and the like. The modem processor mainly processes wireless communication, for example, a baseband processor. It can be understood that the modem processor may alternatively be not integrated in the processor 610.

The terminal provided in this embodiment of this application can implement the processes implemented in the method embodiment shown in FIG. 2, with the same technical effects achieved. To avoid repetition, details are not described herein again.

An embodiment of this application further provides a radio access network node. As shown in FIG. 7, the radio access network node 700 includes an antenna 701, a radio frequency apparatus 702, and a baseband apparatus 703. The antenna 701 is connected to the radio frequency apparatus 702. In an uplink direction, the radio frequency apparatus 702 receives information by using the antenna 701, and sends the received information to the baseband apparatus 703 for processing. In a downlink direction, the baseband apparatus 703 processes information to be sent, and sends the information to the radio frequency apparatus 702; and the radio frequency apparatus 702 processes the received information and then sends the information by using the antenna 701.

The baseband processor may be located in the baseband apparatus 703. The method performed by the network-side device in the foregoing embodiment may be implemented in the baseband apparatus 703, and the baseband apparatus 703 includes a processor 704 and a memory 705.

The baseband apparatus 703 may include, for example, at least one baseband processing unit, where a plurality of chips are disposed on the baseband processing unit. As shown in FIG. 7, one of the chips is, for example, the processor 704, and connected to the memory 705, to invoke a program in the memory 705 to perform the operations of the network device shown in the foregoing method embodiment.

The baseband apparatus 703 may further include a network interface 706, configured to exchange information with the radio frequency apparatus 702, where the interface is, for example, a common public radio interface (CPRI).

Specifically, the network-side device in this embodiment of this application further includes instructions or a program stored in the memory 705 and capable of running on the processor 704. The processor 704 invokes the instructions or program in the memory 705 to perform the method performed by the modules shown in FIG. 5, with the same technical effects achieved. To avoid repetition, details are not described herein again.

An embodiment of this application further provides a computer program product, where the computer program product is stored in a non-volatile storage medium, and the computer program product is executed by at least one processor to implement the steps of the processing method shown in FIG. 2 or FIG. 3.

An embodiment of this application further provides a readable storage medium, where the readable storage medium may be non-transitory. The readable storage medium stores a program or instructions, and when the program or instructions are executed by a processor, the processes of the method embodiment shown in FIG. 2 or FIG. 3 are implemented, with the same technical effects achieved. To avoid repetition, details are not described herein again.

The processor is a processor in the terminal in the foregoing embodiment. The readable storage medium includes a computer-readable storage medium, such as a computer read-only memory (ROM), a random access memory (RAM), a magnetic disk, or an optical disc.

An embodiment of this application further provides a chip. The chip includes a processor and a communications interface. The communications interface is coupled to the processor, and the processor is configured to run a program or instructions of a network-side device to implement the processes of the method embodiment shown in FIG. 2 or FIG. 3, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that, in this specification, the terms "include", "comprise", or any of their variants are intended to cover a non-exclusive inclusion, such that a process, method, article, or apparatus that includes a series of elements not only includes those elements but also includes other elements that are not expressly listed, or further includes elements inherent to such process, method, article, or apparatus. In the absence of more restrictions, an element preceded by the statement "includes a . . . " does not preclude the presence of other identical elements in the process, method, article, or apparatus that includes the element. In addition, it should be noted that the scope of the method and apparatus in the implementations of this application is not limited to functions being performed in the order shown or discussed, and may further include functions being performed at substantially the same time or in a reverse order, depending on the functions involved. For example, the described method may be performed in an order different from the order described, and steps may be added, omitted, or combined. In addition, features described with reference to some examples may be combined in other examples.

From the foregoing description of the implementations, persons skilled in the art can clearly understand that the method in the foregoing embodiments may be implemented by software with a necessary general hardware platform. Certainly, the method in the foregoing embodiments may alternatively be implemented by hardware. However, in many cases, the former is a preferred implementation. Based on such understanding, the technical solutions of this application essentially or the part thereof that contributes to the prior art may be implemented in a form of a software product. The computer software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms which do not depart from the essence of this application and the protection scope of the claims, and all such forms shall fall within the protection scope of this application.

What is claimed is:

1. A sequence number (SN) synchronization method for multicast broadcast service, performed by a terminal and comprising:

obtaining a first radio interface SN of a first multicast broadcast service received in a first cell and a second radio interface SN of the first multicast broadcast service received in a second cell; and sorting data packets of the first multicast broadcast service according to the first radio interface SN and the second radio interface SN; wherein the first radio interface SN and the second radio interface SN are in a same SN set, and the first radio interface SN and the second radio interface SN are at least partially different.

2. The method according to claim 1, wherein the method further comprises:

when the data packets of the first multicast broadcast service are inconsecutive, determining that a data packet in the first multicast broadcast service is missing; and in a case that the first multicast broadcast service does not support reordering of the data packets, skipping starting a reordering timer at a gap when the missing data packet is detected; or in a case that the first multicast broadcast service supports reordering of the data packets, starting a reordering timer at a gap when the missing data packet is detected.

3. The method according to claim 2, wherein the method further comprises:

receiving first information, wherein the first information indicates information about the missing data packet for the first multicast broadcast service.

4. The method according to claim 3, wherein the receiving first information comprises:

receiving a data packet previous to or next to the missing data packet, wherein a header of the data packet previous to or next to the missing data packet carries the first information;

or receiving a control PDU, wherein the control PDU carries the first information.

5. A terminal, comprising: a processor, a memory, and a program stored in the memory and configured to run on the processor, wherein the program, when being executed by the processor, causes the program to:

obtain a first radio interface SN of a first multicast broadcast service received in a first cell and a second radio interface SN of the first multicast broadcast service received in a second cell; and sort data packets of the first multicast broadcast service according to the first radio interface SN and the second radio interface SN; wherein the first radio interface SN and the second radio interface SN are in a same SN set, and the first radio interface SN and the second radio interface SN are at least partially different.

6. The terminal according to claim 5, wherein the processor is further configured to: when the data packets of the first multicast broadcast service are inconsecutive, determine that a data packet in the first multicast broadcast service is missing; and in a case that the first multicast broadcast service does not support reordering of the data packets, skip starting a reordering timer at a gap when the missing data packet is detected; or in a case that the first multicast broadcast service supports reordering of the data packets, start a reordering timer at a gap when the missing data packet is detected.

7. The terminal according to claim 6, wherein the processor is further configured to receive first information, wherein the first information indicates information about the missing data packet for the first multicast broadcast service.

8. The terminal according to claim 7, wherein the processor is further configured to: receive a data packet previous to or next to the missing data packet, wherein a header of the data packet previous to or next to the missing data packet carries the first information; or receive a control PDU, wherein the control PDU carries the first information.

\* \* \* \* \*